US008966266B2

(12) United States Patent
Brier et al.

(10) Patent No.: US 8,966,266 B2
(45) Date of Patent: Feb. 24, 2015

(54) METHOD FOR OBTAINING ENCRYPTION KEYS CORRESPONDING TERMINALS, SERVER AND COMPUTER PROGRAM PRODUCTS

(75) Inventors: Eric Brier, Valence (FR); Thomas Peyrin, Singapore (SG)

(73) Assignee: Compagnie Industrielle et Financiere d'Ingenierie, "Ingenico", Paris (FR)

( * ) Notice: Subject to any disclaimer, the term of this patent is extended or adjusted under 35 U.S.C. 154(b) by 269 days.

(21) Appl. No.: 13/699,043

(22) PCT Filed: May 16, 2011

(86) PCT No.: PCT/EP2011/057842
§ 371 (c)(1),
(2), (4) Date: Sep. 23, 2013

(87) PCT Pub. No.: WO2011/144554
PCT Pub. Date: Nov. 24, 2011

(65) Prior Publication Data
US 2014/0149744 A1     May 29, 2014

(30) Foreign Application Priority Data

May 20, 2010    (FR) ...................................... 10 53945
May 31, 2010    (FR) ...................................... 10 54217

(51) Int. Cl.
     *H04L 9/32*           (2006.01)
     *H04L 9/08*           (2006.01)

(52) U.S. Cl.
     CPC ............ *H04L 9/0819* (2013.01); *H04L 9/0838* (2013.01); *H04L 9/0869* (2013.01); *H04L 2209/38* (2013.01)
     USPC ............. 713/171; 713/168; 380/44; 380/259; 380/265; 380/278; 380/286

(58) Field of Classification Search
     CPC ....... H04L 9/08; H04L 9/0819; H04L 9/0838; H04L 9/0869
     USPC ............ 380/44, 278, 286, 259, 265; 713/168, 713/171
See application file for complete search history.

(56) References Cited

U.S. PATENT DOCUMENTS 5,754,563 A *   5/1998   White ............................ 714/757
6,701,435 B1 *   3/2004   Numao et al. ................ 713/168
(Continued)

FOREIGN PATENT DOCUMENTS

WO     2010053885 A1     5/2010

OTHER PUBLICATIONS

Wikipedia: "Derived unique key per transaction", Internet Citation, Sep. 7, 2009, pp. 1-5, XP007918284, Retrieved from the Internet: URL: http://en.wikipedia.org/w/index.php?title=Derived_unique_key_per_transaction&oldid=312404635.
(Continued)

*Primary Examiner* — Jeffrey Pwu
*Assistant Examiner* — Jayesh Jhaveri
(74) *Attorney, Agent, or Firm* — David D. Brush; Westman, Champlin & Koehler, P.A.

(57) ABSTRACT

A method and apparatus for obtaining an encryption key for an item of data transmitted from a client to a server. The method includes: determining a number R of registers available within the client for carrying out a plurality of calculations of encryption keys; determining a maximum number N of iterations necessary for obtaining at least one encryption key at the server; obtaining a structure of data representative of a key calculation state effected within the R available registers; calculating the at least one encryption key as a function: —of the number of available registers R, by performing at most N calls to a pseudo-random function F and —of the data structure; so that the at least one encryption key can be obtained from a combination of at most $T=C_{R+N}^{N}-1$ encryption keys based on a secret previously shared between the server and client.

10 Claims, 4 Drawing Sheets

(56) References Cited

U.S. PATENT DOCUMENTS

| | | | | |
|---|---|---|---|---|
| 6,968,493 | B1* | 11/2005 | Weng | 714/782 |
| 7,734,046 | B2* | 6/2010 | Urban et al. | 380/46 |
| 8,479,000 | B2* | 7/2013 | Takayama et al. | 713/171 |
| 2003/0091185 | A1* | 5/2003 | Swindlehurst et al. | 380/44 |
| 2004/0223609 | A1* | 11/2004 | Wu | 380/37 |
| 2004/0234073 | A1* | 11/2004 | Sato et al. | 380/28 |
| 2007/0147621 | A1* | 6/2007 | Barkan et al. | 380/286 |
| 2008/0049940 | A1 | 2/2008 | Koeher | |
| 2010/0241859 | A1* | 9/2010 | Osmolovsky | 713/170 |
| 2012/0278375 | A1* | 11/2012 | Belenky et al. | 708/603 |

OTHER PUBLICATIONS

International Search Report and Written Opinion dated Aug. 30, 2011 for corresponding International Patent Application No. PCT/EP2011/057842, filed May 16, 2011.

International Preliminary Report on Patentability and Written Opinion dated Nov. 20, 2012 for corresponding International Patent Application No. PCT/EP2011/057842, filed May 16, 2011.

French Search Report and Written Opinion dated Apr. 15, 2011 for corresponding French Patent Application No. 1054217, filed May 31, 2010

* cited by examiner

METHOD FOR OBTAINING ENCRYPTION KEYS CORRESPONDING TERMINALS, SERVER AND COMPUTER PROGRAM PRODUCTS

CROSS-REFERENCE TO RELATED APPLICATIONS

This Application is a Section 371 National Stage Application of International Application No. PCT/EP2011/057842, filed May 16, 2011, which is incorporated by reference in its entirety and published as WO 2011/144554 on Nov. 24, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of the securing of data exchanges between two devices.

The present disclosure pertains more particularly to securing by means of encryption keys which enable an encryption of the data exchanged. The data exchanged may be, for example, data for authenticating a user such as an identifier, a password or again a confidential code.

BACKGROUND OF THE DISCLOSURE

In a context of encryption of confidential codes or encryption of data pertaining to a card bearer (a personal access number, an expiry date, etc), the *American National Standards Institute* (ANSI) requires the use of a scheme of management of encryption keys compliant with the ANSI X9.24 standard. This document proposes three possible methods for encryption, including the "Derive Unique Key Per Transaction" (DUKPT) method. This method is universally recognized as being the most advanced in terms of security.

This DUKPT technique for managing encryption keys is being increasingly implemented and is naturally becoming prevalent as the standard for encrypting data (such as a confidential code, a personal access number, an expiry date, etc) relating to a card carrier.

According to this DUKPT technique, whenever there is a transaction, a new key is derived in a terminal to encrypt the sensitive data, data that will be sent at the same time as a counter thereafter enabling the server to retrieve the key used by the terminal (naturally, a secret is deemed to shared between the terminal and the server once the system is initialized).

For further information on the DUKPT technique, reference may be made to the document ANSI X9.24.

This method has two advantages in terms of security. Firstly, the encryption keys derived will all be different for each transaction. This greatly limits physical attacks on the transaction keys since each of them will be used once and only once. Furthermore, the DUKPT is a "forward secure" method: at any point in time, if a part of the secret information contained in the terminal or its integrity is compromised, the attacker will be unable to retrieve the encryption keys used for the previous transactions. This greatly limits the impact that might be had by any compromised terminal (for example a payment terminal).

The DUKPT technique however suffers from a few drawbacks which are retarding its spread.

In a practical way, the DUKPT described in the document ANSI X9.24 enables the generation of slightly more than a million keys (and therefore the management of an equivalent number of transactions). These advantages in terms of security entail drawbacks. First of all, a terminal implementing DUKPT must reserve twenty one registers of keys in a secured memory throughout the lifecycle of the DUKPT. These registers are used to compute the derived keys. The secured memory is fairly limited in practice and this limit becomes very soon a source of problems when it is desired to use several DUKPTs on a same terminal (which is often the case). A register is a specific location of the memory dedicated to a particular use in the context of the present disclosure.

Furthermore, at the level of the server, once the counter has been received from the terminal, a certain number of computations are needed to enable the server to derive the key used by the terminal. The DUKPT guarantees that the key is derived at the end of a maximum of ten iterations. It must be noted that these computations are relatively lengthy and represent a predominant part of the processing load of the server. In other words, the DUKPT technique:
  requires a great deal of secured memory in the terminal;
  requires many computations at the decrypting server;
  is a solution that is complex to implant and not modulable.
  Thus, to promote the solution proposed by DUKPT, there is a need to provide a key-derivation technique that resolves the above described drawbacks.

SUMMARY

An exemplary embodiment of the invention relates to a method for obtaining at least one key for encrypting at least one piece of data transmitted from a client to a server, characterized in that it comprises:
  a step for determining a number R of registers available within said client to carry out a plurality of computations of encryption keys;
  a step for determining a maximum number N of iterations needed to obtain at least one encryption key from said server;
  a step for obtaining a structure of data pieces representative of a key computation state achieved within said R available registers;
  a step for computing said at least one encryption key as a function of:
    said number of R available registers of said client,
    in performing at most N calls to a pseudo-random function F, and
    of said structure of data pieces;
  so that said at least one encryption key can be obtained from a combination of at most $T = C_{R+N}^{N} - 1$ encryption keys on the basis of a secret preliminarily shared between said server and said client.

Thus, depending on constraints, the parameters R, N and T are determined in order to determine encryption keys that correspond to different situations. Indeed, this technique can be adapted entirely to a precise situation (so long as the DUKPT is completely fixed in its parameters because of its complexity). Thus, it is easy, through an embodiment of the invention using the same software and hardware layout, to manage two opposite situations and adapt accordingly in order to maximize the performance.

According to one particular embodiment, the number R of available registers and the maximum number N of iterations are defined as a function of the constraints of the server and the constraints of the client and the security constraints.

Thus it is possible, for a constant number T of keys that it will be possible to generate (called a security level T), to make a trade-off between the load of the server, for which the parameter N is deduced, and the capacities of the client, especially in terms of secured memory capacity, represented by the parameter R defining the number of registers available within the client. It is also possible to make the level of security T vary to determine a compromise between the security level T and the parameters of the client and/or of the server.

The steps for determining consist in setting up (obtaining) a consensus on the choice of the values of the parameters N, R, T between the server and the client.

The step for setting up the parameters N, R, T can be dynamic: the server and the client would exchange information to modify at least one of the parameters N, R, T, i.e.:
  once when setting up communication between the server and the client: before the first transaction (or the first communication between the client and the server), the client and the server agree on the choice of the parameters N, R, T;
  "during the lifetime" of the client, an initial shared secret is changed and the parameters N, R, T are reinitialized: indeed, the key IK in the client having been erased a new IK is determined between the server and the client (depending on the keys present in the register of the clients or depending on the new key exchanged between the client and the server).

The step for setting up the parameters N, R, T can be static: this is the case where everything is fixed beforehand as in the usual DUKPT technique.

Finally, the security constraints relate to the number of keys that can be derived.

According to one particular embodiment, said method further comprises, when it is implemented within said client, a step for sending a piece of data representing said structure of data pieces representative of a key computation state achieved within said R available registers, registers denoted as $R_R, \ldots R_1$.

The data corresponding to said structure of data pieces representative of a key computation state achieved within said R available registers is either a counter corresponding to the order number of the transaction in progress or to said structure of data pieces as such.

According to one particular characteristic, said structure of data pieces representative of a key computation state achieved within said R available registers is a concatenation of R integers, $st=D=D_R \ldots D_1$ each integer $D_i$ representing a distance between said secret preliminarily shared between said server and said client and a key stored in a register R of said client, said distance corresponding to a number of iterations of said pseudo-random function F.

According to one particular embodiment, said method comprises:
  a step for determining, starting from the register $R_1$ up to a maximum at the register $R_R$, a position p of the smallest register $R_p$, for which an associated distance $D_p$ is strictly smaller than the number N+1, said register $R_p$ comprising an encryption key K, used for a given transaction;

a step for updating said structure of data pieces comprising:
  when $D_p < N$:
    a step for updating the p registers $R_p \ldots R_1$ by computation, on the basis of said register key K, of said pseudo-random function F, said data structure D and an integer i, such that $R_i = F(K, D, i)$ for $1 <= i <= p$;
    a step for updating said data structure so that $D_i = D_p + 1$ with $1 <= i <= p$;
  when $D_p = N$, a step for erasing the content of said register $R_p$ and a step for updating the number $D_p = D_p + 1 = N + 1$.

According to one particular embodiment, when it is implemented within said server, said step for obtaining comprises:
  a step for receiving a piece of data representing said structure of data pieces representative of a key computation state performed within said R available registers;
  a step for reading said received piece of data delivering said structure of representative data pieces;
  a step for computing said structure of data pieces representative of a key computation state achieved within said R available registers when said structure of representative data pieces is not directly read in said data received.

According to one particular embodiment, said structure of data pieces is defined as being a concatenation of R integers: $st=D=D_R \ldots D_1$ where each integer $D_i$ represents a distance between said secret preliminarily shared between said server and said client, and a key stored in a register $R_i$ of said client and the step for computing said at least one encryption key comprises:
  a step for initializing a local distance d at 1 and a register position p such that p=p', with p' being a number corresponding to the most significant position starting from the register $R_R$ up to the register $R_1$, such that $D_{p'} > 1$;
  a first step of computation to obtain a key K=F (preliminarily shared secret, $0^R$, p') where $0^R$ corresponds to R times 0,
  and at least one iteration:
    of a computation to obtain a key $K=F(K, g_{p,d}(D), p)$ where $g_{p,d}(D)=D'_R \ldots D'_1$ for which $D'_i=N+1$ if i ranges from 1 and p-1, $D'_i=d$ if i=p and $D'_i=D_i$ if i ranges from p+1 and R and a step to update the variable d such that d=d+1 so long as the following condition is verified: $d < D_p - 1$;
    if the number p=1, then a computation step consisting in obtaining a key $K=F(K, g_{p,d}(D), p)$ corresponding then to the key temporarily shared with the client and in stopping the iteration of the steps;
    determining a position p' such that $D_{p'} > D_p$;
    if $D_{p'} != N+1$, a step for computing a key $K=F(K, g_{p,d}(D), p')$ and a step for updating the variables p=p' and d=d+1.
    if not, performing a step consisting in computing a key $K=F(K, g_{p,d}(D), p'+1)$ then corresponding to the key shared temporarily with the client and stopping the iteration of the steps.

According to another aspect, an embodiment of the invention pertains to a device for obtaining at least one key for encrypting at least one piece of data transmitted from a client towards a server. According to an embodiment of the invention, such a device comprises:
  means for determining a number R of registers available within said client to carry out a plurality of computations of encryption keys;
  means for determining a maximum number N of iterations needed to obtain at least one encryption key from said server;

means for obtaining a structure of data pieces representative of a key computation state achieved within said R available registers;

means for computing said at least one encryption key as a function of:
  said number of R available registers of said client,
  in performing at most N calls to a pseudo-random function F, and of
  said structure of data pieces;

so that said at least one encryption key can be obtained from a combination of at most $T=C_{R+N}^N-1$ encryption keys on the basis of a secret preliminarily shared between said server and said client.

According to another aspect, an embodiment of the invention pertains to a computer program product downloadable from a communications network and/or stored on a computer-readable support and/or executable by a microprocessor. According to an embodiment of the invention, such a program comprises program code instructions to execute the method for obtaining as described here above.

According to another aspect, an embodiment of the invention also pertains to a signal for obtaining at least one key for encrypting at least one piece of data transmitted from a client to a server. According to an embodiment of the invention, such a signal includes a structure of data pieces representing a state of encryption key computation achieved within said client, a content of said structure being a function of a number R of registers available within said client to carry out a plurality of computations of encryption keys and a maximum number N of iterations needed to obtain at least one encryption key from said server, so that said at least one encryption key can be obtained from a combination of at most $T=C_{R+N}^N-1$ encryption keys on the basis of a secret preliminarily shared between said server and said client.

BRIEF DESCRIPTION OF THE DRAWINGS

Other features and advantages shall appear more clearly from the following description of a preferred embodiment given by way of a simple illustrative and non-exhaustive example and from the appended drawings of which.

DETAILED DESCRIPTION OF ILLUSTRATIVE EMBODIMENTS

Figure 1:
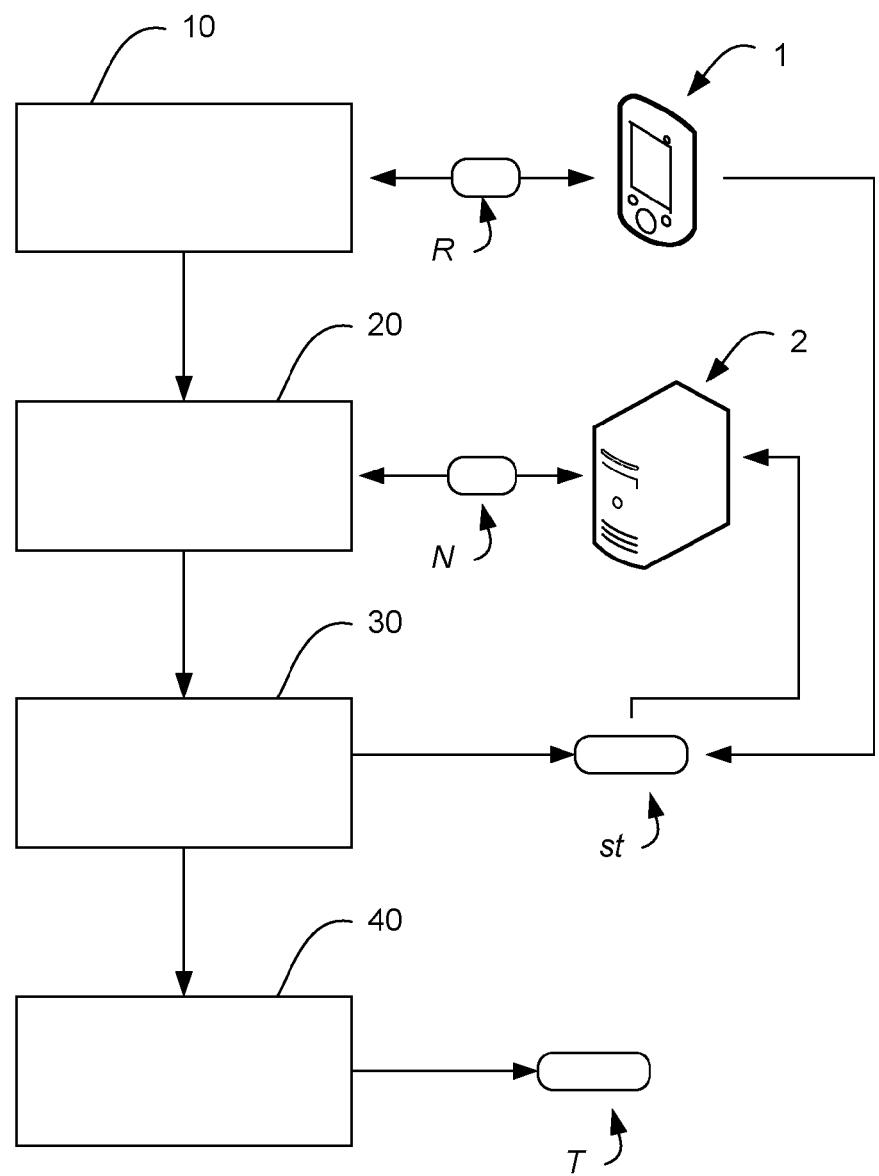
FIG. 1 is a block diagram of the technique of an embodiment of the invention.

1. Reminder of the Principle of an Embodiment of the Invention

An embodiment of the invention proposes a novel method for implementing the DUKPT method in which the information transmitted from the terminal to the server makes it possible, on the one hand, to reduce the quantity of secured memory used at the terminal and, on the other hand, to reduce the number of iterations needed for the discovery of the key generated by the terminal. The method of an embodiment of the invention therefore makes it possible to:

diminish the quantity of secured memory to be used in the terminal;

reduce the number of computations at the level of the encryption server.

In a complementary and unexpected way, the inventors have also observed that the proposed method increases the level of security of the DUKPT. Indeed, when the proposed method is implemented in a terminal that comprises a sufficient secured memory and a dedicated server which performs the computations rapidly, it is possible to compute not one million keys (as is the case with a DUKPT by using 21 registers and ten iterations) but 40 million keys, still using 21 registers and ten iterations.

Thus, the present application describes a novel technique improving the original DUKPT algorithm. The security guarantees are exactly the same: one unique key is used per transaction and the fact that a key is compromised does not compromise the preceding and subsequent keys (i.e. forward security). On the contrary, the performance and required memory are improved.

For example, the classic use consists in enabling the generation of at least one million keys with a guarantee that each transaction key will be derived in the server with at most ten iterations. In this situation, the method of an embodiment of the invention enables the use of only 13 registers at the terminal instead of the 21 registers required for DUKPT. This type of improvement facilitates the layout of this type of management of encryption keys.

Furthermore, it is essential to note that the technique of an embodiment of the invention is simpler than DUKPT and is above all modulable. Indeed, the technique of an embodiment of the invention can be adapted entirely to a precise situation (while the DUKPT as currently proposed is completely fixed in its parameters because of its complexity). Thus, it is very easy, with the technique of an embodiment of the invention, to enable the management, with the same configuration, of two diametrically opposite situations and to adapt accordingly to maximize performance. This modularity works with three parameters:

the number of R available registers in the terminal;
the maximum number of iterations N in the server to retrieve the key;
the total number of distinct keys T that can be generated.

Thus, for a given level of securing (for example T is greater than or equal to one million), it is possible with the technique of an embodiment of the invention to obtain a variation of both R and N as a function of the situation of the terminal (the number of registers R available to it) and of the server (the number of iterations N that it can accept according to its load). Thus, for a first terminal R may for example be equal to 13 and N equal to 10 at the server while, for a second terminal, R may for example be equal to 14 and N equal to 9 at the server. The level of security (for example the number T is greater than or equal to one million) is the same.

This modularity, as presented, is not possible with the prior-art technique. This modularity is possible according to an embodiment of the invention through the implementing of two methods: one on the terminal (the client) and the other on the server. The execution of these methods and the transmission of data by the terminal to the server resolves the problem of absence of modularity existing in the prior-art techniques and therefore the problems of memory size and the problems of load of the servers.

Referring to FIG. 1, we present the general principle of an embodiment of the invention as implemented both from the client side and the server side. Disparities exist between the client and the server. They are described here below. The method of an embodiment of the invention comprises, in its widest interpretation:

a step (10) for determining a number R of registers available within said client (1) to perform a plurality of computations of encryption keys;

a step (20) for determining a maximum number N of iterations needed for obtaining at least one encryption key from said server (2);

a step (30) for obtaining a data structure (st) representing a state of computation of keys performed within said R available registers;

a step (40) for computing said at least one encryption key (K) as a function of:
- said number of R available registers of said client,
- in making at least N calls to a pseudo-random function F and
- said data structure;

so that said at least one encryption key can be obtained from a combination $T=C_{R+N}^{N}-1$ of encryption keys on the basis of a secret preliminarily shared between said server and said client.

The combination $T=C_{R+N}^{N}-1$ is also denoted as $$T = \binom{R+N}{N} - 1$$

in certain passages of the document.

In other words:

Let IK be a key originally shared between the terminal and the server. It is assumed that this is key formed by k bits and it is desired that the transaction keys should be of the same size. Let F: $\{0,1\}^* \to \{0,1\}^k$ be a pseudo-random function. $\|$ denotes the operation of concatenation.

Terminal Side:

The terminal is first of all initialized in filling its R registers as follows: for the $j^{th}$ register Rj, the value contained in this register is $Rj=F(IK\|j)$. At the same time, to make it easier to understand the description, it can be said that a table Tbl of R local counters, all set at 1, is kept up to date. The counter situated in the compartment j of the table Tbl corresponds to the number of iterations needed, starting from the original key IK, to obtain the transaction key stored in the register Rj. Naturally, it is ensured that none of these counters exceeds the value N since this number represents the maximum number of iterations on the server side. Finally, a transaction counter CT is set at 0.

At each transaction (for example a bank transaction) the transaction counter CT is incremented by 1. The transaction key (used for this transaction) is the key that is situated in the register of least significant value and for which the corresponding local counter j is lower than or equal to N. This least significant register is denoted as Rk and the corresponding transaction key is denoted as K. The value stored in the local counter j corresponding to Rk is denoted as C. Once the key K is used (for the transaction), the registers and the local counters are updated:

- if C<N, all the registers Ri having significance values lower than or equal to k (i.e. i≤k) receive the value $Ri=F(K\|k\|i)$ while the corresponding counters are modified at C+1 (they are increased by the value 1);
- if C=N, K is erased from the register Rk and the corresponding local counter is incremented (and therefore passes to N+1).

The transaction data pieces are then encrypted by the terminal with this transaction K to be transmitted to the server.

Server Side:

When the transaction K is obtained by the terminal (the obtaining method preliminarily described makes it possible to obtain this key), the sensitive data pieces of the transaction are encrypted with this transaction key K and transmitted to the server with the transaction counter CT. The server receives the counter CT and deduces its key derivation path from IK. Once the transaction key K is obtained, it can decrypt the data encrypted by the terminal.

It noted that all the transaction keys are distinct. Furthermore, the method is truly the "forward secure" method since the compromising of the R registers of the terminal does not make it possible to retrieve information on the keys used during the previous transactions. As in the case of the DUKPT technique, this is due to the fact that the function F is non-reversible.

In terms of performance, the method of an embodiment of the invention truly guarantees a maximum of N iterations in the server for R registers stored in the terminal. The number of keys T that can be generated is a function of R and N:

$$T = \sum_{i=1}^{N} \sum_{j=1}^{R} a(i, j)$$

with a(i, 1)=1 for all i, a(1, j)=1 for all j, and $$a(n,r) = \sum_{i=1}^{r} a(n-1, i)$$

Figure 2:
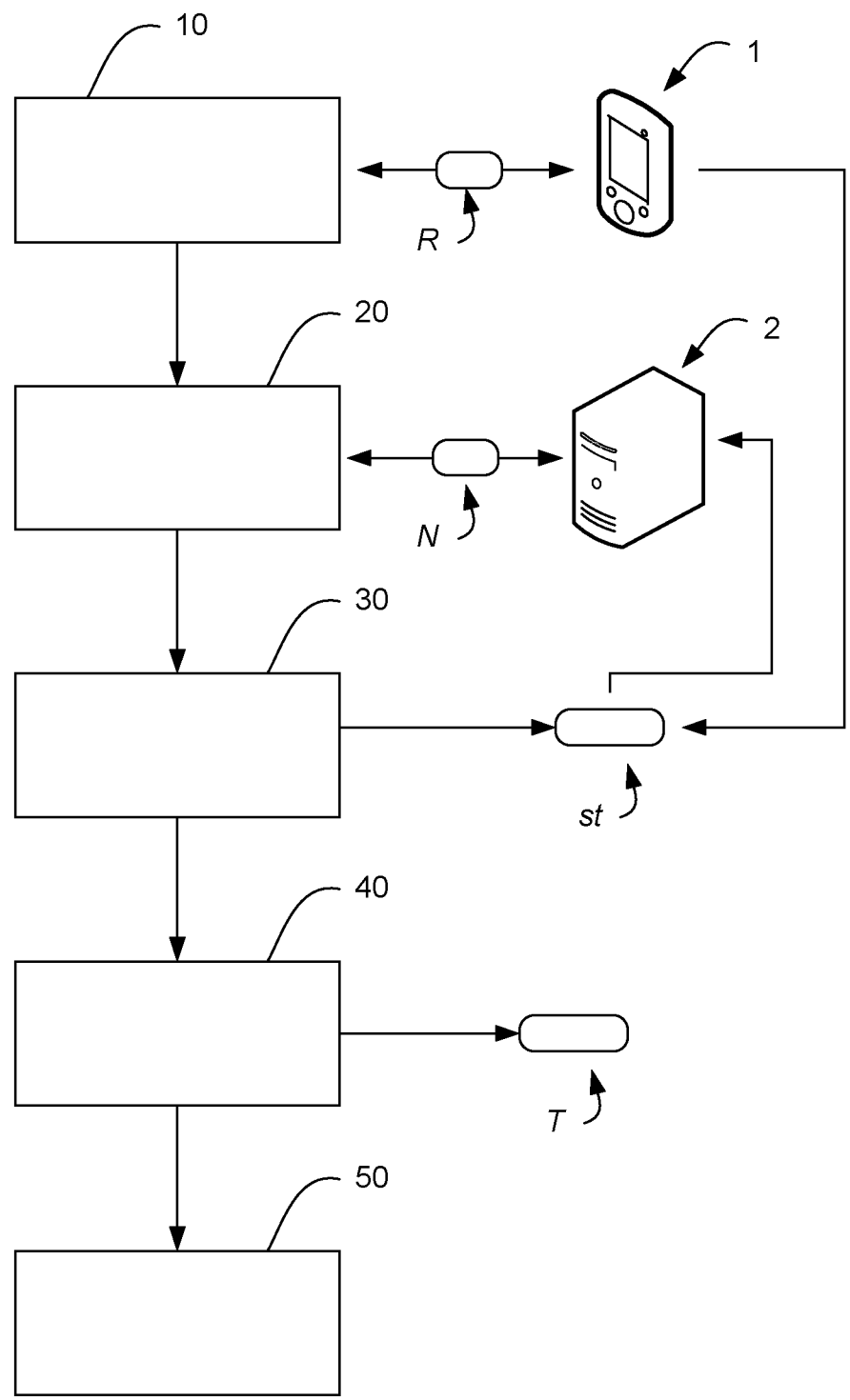
FIG. 2 illustrates the technique of an embodiment of the invention at the level of a client.

Referring now to FIG. 2, we present an embodiment of the invention implemented within the client. The method of an embodiment of the invention implemented within the client comprises:

a step (10) for determining a number R of registers available within said client (1) to achieve a plurality of computations of encryption keys;

a step (20) for determining a maximum number N of iterations needed to obtain at least one encryption key from said server (2);

a step (30) for obtaining a structure of data pieces (st) representative of a key computation state achieved within said R available registers;

a step (40) for computing said at least one encryption key (K) as a function of:
- said number of R available registers of said client;
- in performing at most N calls to a pseudo-random function F, and
- of said data structure;

so that said at least one encryption key can be obtained from a combination $T=C_{R+N}^{N}-1$ of encryption keys on the basis of a secret preliminarily shared between said server and said client;

a step (50) for sending a piece of data representing said structure of data pieces (st) representative of a key computation state achieved within said R available registers, these registers being denoted as $R_R, \ldots R_1$.

Figure 3:
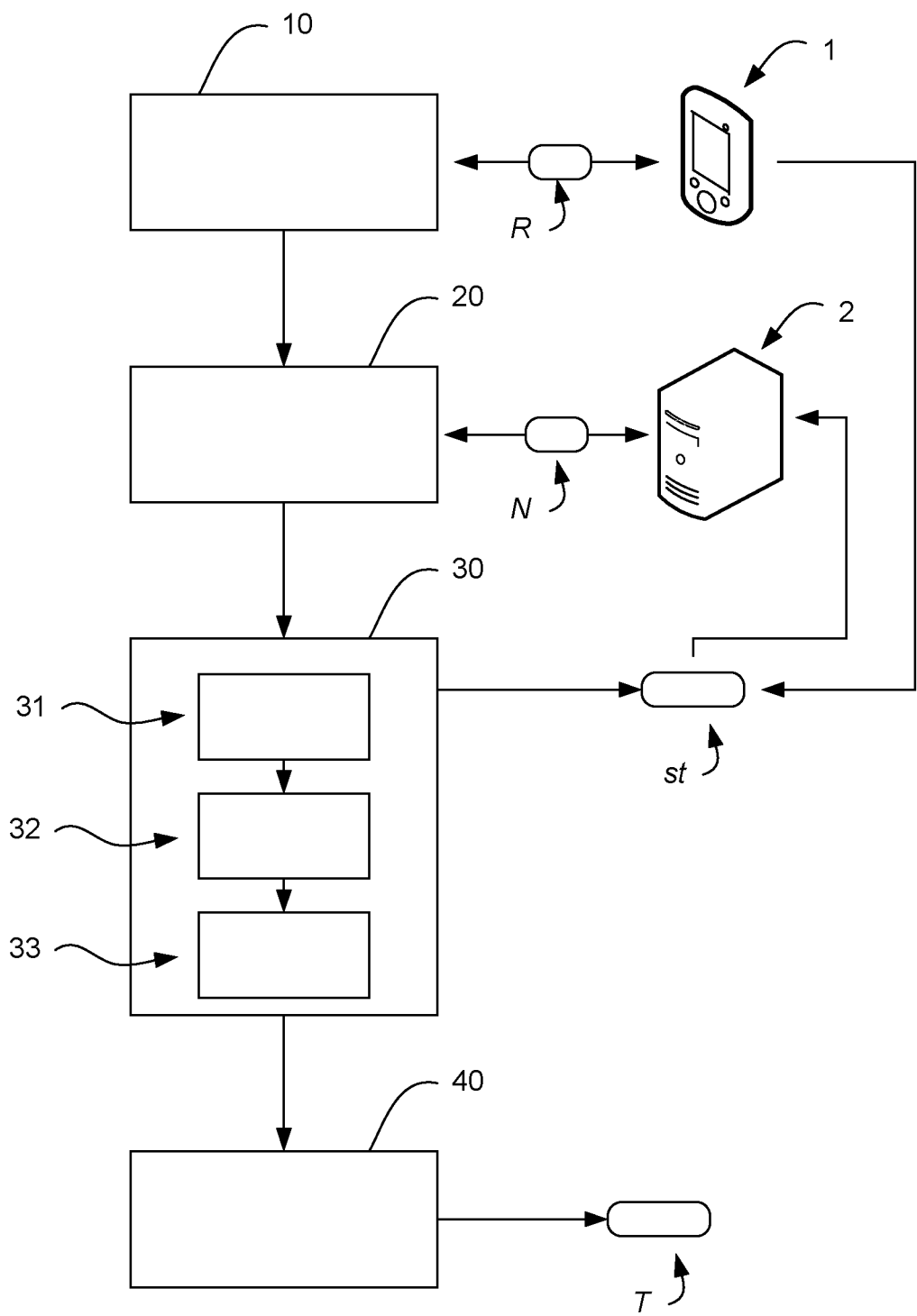
FIG. 3 illustrates the technique of an embodiment of the invention at the level of a server.

Referring to FIG. 3, we present an embodiment of the invention implemented within the server. The method of an embodiment of the invention implemented within the server comprises:

a step (10) for determining a number R of registers available within said client (1) to achieve a plurality of computations of encryption keys;

a step (20) for determining a maximum number N of iterations needed to obtain at least one encryption key from said server (2);

a step (30) for obtaining a structure of data pieces (st) representative of a key computation state achieved within said R available registers;

a step (40) for computing said at least one encryption key (K) as a function of:
  said number of R available registers of said client;
  in performing at most N calls to a pseudo-random function F, and
  of said data structure;

so that said at least one encryption key can be obtained from a combination $T=C_{R+N}^{N}-1$ of encryption keys on the basis of a secret preliminarily shared between said server and said client;

In one embodiment of the invention, the obtaining step (30) comprises:

a step (31) for receiving a piece of data representing said structure of data pieces representative of a key computation step performed within said R available registers;

a step (32) for reading said piece of data received delivering said structure of representative data pieces;

a step (33) for computing said structure of data pieces representative of a key computation state achieved within said available R registers when said structure of representative data pieces is not directly read in said received piece of data.

Thus, it must be noted that the computation step (33) is not always necessary. Depending on the received piece of data sent by the client, the server has its computation and/or storage load increased to a greater or lesser extent.

Here below, the case is presented of a particular implementation of the technique of the invention. It is clear however, that the invention is not limited to this particular application but can also be implemented in other configurations.

2. Description of One Embodiment

In this embodiment, we present the application of the method of the invention to a method known as the "Optimal-DUKPT" method in that it is to replace the prior-art DUKPT technique.

The basic idea for improving the DUKPT can be grasped in the following simple manner: for any first operation tc=1 of DUKPT, the key $K_1$ situated in the first register is used and erased directly.

It can be noted that this key is not an offspring in the key hierarchy and that its parent is the key IK (which is at the distance 1 from the key IK). In other words, the server can retrieve K1 from IK with a single application of F. Instead of erasing K1 directly and since we are far from achieving ten iterations of F on the server side, it is possible to derive another key from K1 and place it in this first register. In extending this idea, the inventors had the idea of generating nine additional keys with the first register only.

And this can be broadened to other registers too. So long as the first register contains a key situated at a distance of ten from IK, it can no longer be derived again.

Then, it is necessary to use a key situated in the second register but, before erasing it from the client's memory, it is possible to derive two new keys which can be placed in the first register and then in the second register.

These two new keys are at a distance two from the key IK. Again, it is possible to derive several keys by using only the first register but one less than previously since the operation starts from a key at a distance two (and not one) from the key IK. This technique is finally reiterated with all the registers.

2.1. Description

With a view to preserving the scaling of the algorithm, the improved DUKPT as presently described is defined as a family of key management solutions. Each member of the family is identified by the quantity R of key registers available on the part of the client and by the number N of maximum iterations needed to derive a key from the server. It is easy to show that each member can manage a maximum number of keys $$T = \binom{R+N}{N} - 1.$$

As for the original DUKPT, it is assumed that the shared symmetrical key IK has been assigned in a secured manner to the client and to the server. To identify the derived key, for each operation a public character string st acting as a structure of data pieces according to an embodiment of the invention is transmitted from the client to the server. This character string comprises R integers $st_i$, with $1 \leq st_i \leq N$ for $1 \leq i \leq R$. An integer $st_i$ represents the distance of IK from the key stored in the register i of the client's memory before processing the operation. For example, the character string sent for the very first iteration is 1 . . . 1 1, 1 . . . 1 2 for the second, etc.

2.1.1. On the Client Side

The client maintains two tables. Firstly, the classic key registers R, denoted as Ri for $1 \leq i \leq R$. They are simply initialized with Ri=F(IK; $0^R$; i) and when the initialization is terminated, the original key IK is erased from the client's memory.

Secondly, the client maintains a table D of integers R called Di, where Di represents the distance between the key IK and the key stored in the register Ri. This distance represents a number of iterations needed to obtain the key stored in the register Ri from the original key IK. The content of D is exactly what was sent to the server in the character string st. Naturally, it is initialized with Di=1 for $1 \leq i \leq R$.

When it receives a request for processing a new transaction, the client establishes st=D and makes a search in the least significant register having a corresponding distance Di strictly smaller than N+1.

This register, which is called Rp, contains the transaction key K which will be used for the transaction. Then, once the transaction is completed:

if Dp<N, the client updates the p registers Rp, Rp−1, . . . , R1 with Ri=F(K;D; i) and updates the table of the distances with Di=Dp+1 with $1 \leq i \leq p$.

if Dp=N, the client simply erases the content of the register Rp and updates Dp=Dp+1=N+1. This register will therefore no longer be used.

It can be noted that, in the key derivation process, the pieces of data used at input of F are always unique. Indeed, D will be different for each transaction. This ensures the security of the system. Indeed, "forward secrecy" is always maintained since, after a transaction key has been used, it is always seen to it that this key and its predecessors are no longer present in the client's memory.

An example is given of the progress of the internal state of the clients in the table 2 here below.

2.1.2. On the Server Side

The server receives the character string st corresponding to the table D of the client before processing the transaction. It can be noted that the values stored in this distance table always increase from the most significant register to the least significant register. Furthermore, it can be recalled that, when the client extracts a transaction key from a register Rp, it means that the distance table is such that Di=N+1 for $1 \leq i \leq p-1$.

$g_{p;v}(D)$ denotes the conversion that maps the distance table D to another distance table D' with:

$$\begin{cases} D'_i = N+1, & \text{for } 1 \leq i \leq p-1 \\ D'_i = v, & \text{for } i = p \\ D'_i = D_i, & \text{for } p+1 \leq i \leq R \end{cases}$$

The server first initializes a local value of a distance d=1 and a position value recorded as p=p', with p' being the most significant position with $D_{p'}>1$. Then it computes K=F (IK; $0^K$; p') and does not stop repeating the following process:

- so long as d<Dp−1, we compute K=F(K, $g_{p,d}(D)$, p) and d=d+1;
- if p=1, then K=F(K, $g_{p,d}(D)$, p) is the key shared with the client, and the subsequent part of the iteration stops;
- the server searches for the most significant position p' so that Dp'>Dp. If Dp' is different from N+1, then the server computes K=F(K; gp;d(D); p0) and updates the local variable p=p' and d=d+1. Else, K=F(K, $g_{p,d}(D)$, p'+1) is the key shared with the client and the iterations can be stopped.

This algorithm follows exactly the implicit process performed by the client to obtain the transaction key K from the first key IK. The methods implemented on the client and the server are therefore the same, in their major steps.

TABLE 2

Example of main inputs; distance; updating of tables on client side with parameters of the system N = 3 and R = 3. $TK_i$ denotes the key used for the $i^{th}$ iteration. An X in the "key register update" column means that the client has erased the content from this register.

| iter. | st sent | transaction key used and key registers update | key registers evolution $R_3$ | $R_2$ | $R_1$ | | distance table $D_3$ | $D_2$ | $D_1$ |
|---|---|---|---|---|---|---|---|---|---|
| init | | $R_3 = F(IK, 000, 3)$ | $TK_{10}$ | $TK_4$ | $TK_1$ | in | 0 | 0 | 0 |
| | | $R_2 = F(IK, 000, 2), R_1 = F(IK, 000, 1)$ | | | | out | 1 | 1 | 1 |
| 1 | 111 | $TK_1 = R_1$ | | | $TK_2$ | in | 1 | 1 | 1 |
| | | $R_1 = F(TK_1, 111, 1,)$ | | | | out | 1 | 1 | 2 |
| 2 | 112 | $TK_2 = R_1$ | | | $TK_3$ | in | 1 | 1 | 2 |
| | | $R_1 = F(TK_2, 112, 1)$ | | | | out | 1 | 1 | 3 |
| 3 | 113 | $TK_3 = R_1$ | | | X | in | 1 | 1 | 3 |
| | | erase $R_1$ | | | | out | 1 | 1 | 4 |
| 4 | 114 | $TK_4 = R_2$ | | $TK_7$ | $TK_5$ | in | 1 | 1 | 4 |
| | | $R_2 = F(TK_4, 114, 2), R_1 = F(TK_4, 114, 1)$ | | | | out | 1 | 2 | 2 |
| 5 | 122 | $TK_5 = R_1$ | | | $TK_6$ | in | 1 | 2 | 2 |
| | | $R_1 = F(TK_5, 122, 1)$ | | | | out | 1 | 2 | 3 |
| 6 | 123 | $TK_6 = R_1$ | | | X | in | 1 | 2 | 3 |
| | | erase $R_1$ | | | | out | 1 | 2 | 4 |
| 7 | 124 | $TK_7 = R_2$ | | $TK_9$ | $TK_8$ | in | 1 | 2 | 4 |
| | | $R_2 = F(TK_7, 124, 2), R_1 = F(TK_7, 124, 1)$ | | | | out | 1 | 3 | 3 |
| 8 | 133 | $TK_8 = R_1$ | | | X | in | 1 | 3 | 3 |
| | | erase $R_1$ | | | | out | 1 | 3 | 4 |
| 9 | 134 | $TK_9 = R_2$ | | X | | in | 1 | 3 | 4 |
| | | erase $R_2$ | | | | out | 1 | 4 | 4 |
| 10 | 144 | $TK_{10} = R_3, R_3 = F(TK_{10}, 144, 3)$ | $TK_{10}$ | $TK_{13}$ | $TK_{11}$ | in | 1 | 4 | 4 |
| | | $R_2 = F(TK_{10}, 144, 2), R_1 = F(TK_{10}, 144, 1)$ | | | | out | 2 | 2 | 2 |
| 11 | 222 | $TK_{11} = R_1$ | | | $TK_{12}$ | in | 2 | 2 | 2 |
| | | $R_1 = F(TK_{11}, 222, 1)$ | | | | out | 2 | 2 | 3 |
| 12 | 223 | $TK_{12} = R_1$ | | | X | in | 2 | 2 | 3 |
| | | erase $R_1$ | | | | out | 2 | 2 | 4 |
| 13 | 224 | $TK_{13} = R_2$ | | $TK_{15}$ | $TK_{14}$ | in | 2 | 2 | 4 |
| | | $R_2 = F(TK_{13}, 224, 2), R_1 = F(TK_{13}, 224, 1)$ | | | | out | 2 | 3 | 3 |
| 14 | 233 | $TK_{14} = R_1$ | | | X | in | 2 | 3 | 3 |
| | | erase $R_1$ | | | | out | 2 | 3 | 4 |
| 15 | 234 | $TK_{15} = R_2$ | | X | | in | 2 | 3 | 4 |
| | | erase $R_2$ | | | | out | 2 | 4 | 4 |
| 16 | 244 | $TK_{16} = R_3, R_3 = F(TK_{16}, 244, 3)$ | $TK_{19}$ | $TK_{18}$ | $TK_{17}$ | in | 2 | 4 | 4 |
| | | $R_2 = F(TK_{16}, 244, 2), R_1 = F(TK_{16}, 244, 1)$ | | | | out | 3 | 3 | 3 |
| 17 | 333 | $TK_{17} = R_1$ | | | X | in | 3 | 3 | 3 |
| | | erase $R_1$ | | | | out | 3 | 3 | 4 |
| 18 | 334 | $TK_{18} = R_2$ | | X | | in | 3 | 3 | 4 |
| | | erase $R_2$ | | | | out | 3 | 4 | 4 |
| 19 | 344 | $TK_{19} = R_3$ | X | | | in | 3 | 4 | 4 |
| | | erase $R_3$ | | | | out | 4 | 4 | 4 |

In this example, let it be assumed that the server receives st=224. It positions d=1, p=3 and computes K=F (IK; 000; 3). Then, it does not enter the iteration loop or the first conditional if it computes p'=1 and from $D_{p'}=4=N+1$, the key K=F (K; 144; 2) is the key shared with the client. Table 3 gives a more complicated example.

TABLE 3

Example of derivation of keys on the server side with the parameters of the system N = 8 R = 8 and st = 12466689. The key is determined with eight iterations on the server.

| iter. | key update | | local values | | |
|---|---|---|---|---|---|
| | | | d | p | p' |
| init | K = F(IK, 00000000, 7) | in | | | 7 |
| | | out | 1 | 7 | |
| 1 | K = F(K, 11999999, 6) | in | 1 | 7 | 6 |
| | | out | 2 | 6 | |
| 2 | K = F(K, 12299999, 6) | in | 2 | 6 | 5 |
| | K = F(K, 12399999, 5) | out | 4 | 5 | |
| 3 | K = F(K, 12449999, 5) | in | 4 | 5 | 2 |
| | K = F(K, 12459999, 2) | out | 6 | 2 | |
| 4 | K = F(K, 12466669, 2) | in | 6 | 2 | 1 |
| | K = F(K, 12466679, 2) | out | | | |

2.1.3. Other Characteristics

In at least one complementary embodiment of the invention, the client does not transmit a data structure st as such to the server but a specific piece of data which enables the server to retrieve this data structure st so as to thereafter obtain the encryption key.

Such an embodiment makes it possible to reduce the volume of data transmitted from the client to the server.

3. Other Optional Features and Advantages

Figure 4:
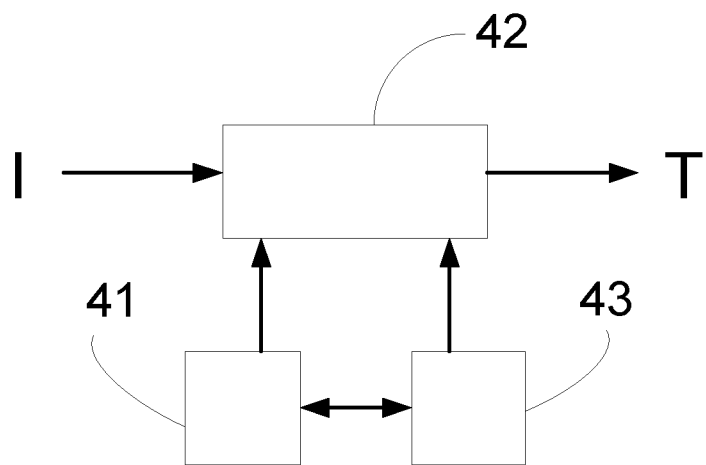
FIG. 4 illustrates the structure of a client.

Referring to FIG. 4, an embodiment is presented of a client comprising means for computing keys and means for transmitting the structure of data pieces st enabling the computer to compute, in turn, the key used by the client.

Such a client comprises a memory 41 (comprising a secured memory comprising R registers constituted by a buffer memory, a processing unit 42 equipped for example with a microprocessor P and driven by a computer program 43, implementing the method of an embodiment of the invention.

At initialization, the code instructions of the computer program 43 are for example loaded into a RAM and then executed by the processor of the processing unit 42. The processing unit 42 inputs at least one piece of information I such as the number of iterations N of the server. The microprocessor of the processing unit 42 implements the steps of the method for processing described here above according to the instructions of the computer program 43, to deliver a piece of processed information T, such as the structure of data pieces st and the data encrypted by means of the key K computed by the terminal. To this end, the encoder device comprises, in addition to the buffer memory 41, means for determining a number R of registers available within said client to carry out a plurality of computations of encryption keys, means for determining a maximum number N of iterations needed to obtain at least one encryption key from said server, means for obtaining a structure of data pieces representative of a key computation state achieved within said R available registers and means for computing said at least one encryption key.

These means are driven by the microprocessor of the processing unit 42.

Figure 5:
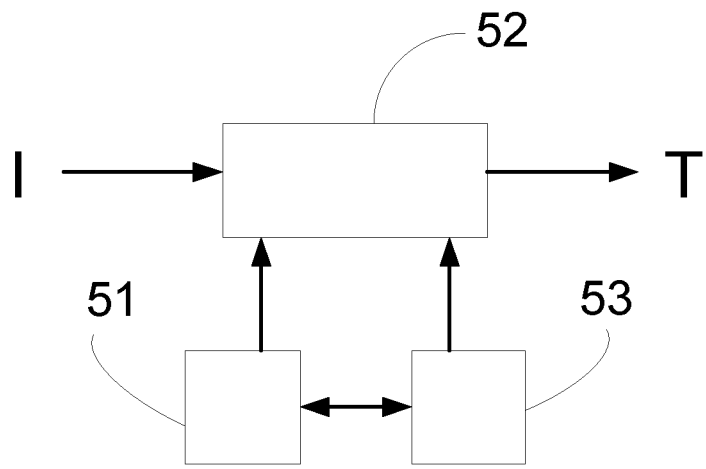
FIG. 5 illustrates the structure of a server.

Referring to FIG. 5, an embodiment is presented of a server comprising means for receiving the structure of data pieces st and means for computing the key used by client.

Such a server comprises a memory 51 (comprising a secured memory comprising R registers constituted by a buffer memory, a processing unit 52 equipped for example with a microprocessor P and driven by a computer program 53, implementing the method of an embodiment of the invention.

At initialization, the code instructions of the computer program 53 are for example loaded into a RAM and then executed by the processor of the processing unit 52. The processing unit 52 inputs at least one piece of information I such as the structure of data pieces st coming from the client, and the data encrypted by it by means of the by means of the key K. The microprocessor of the processing unit 52 implements the steps of the method for processing described here above according to the instructions of the computer program 53, to deliver a piece of processed information T, such as the encryption key K, obtained from the structure of data pieces st.

To this end, the encoder device comprises, in addition to the buffer memory 51, means for determining a number R of registers available within said client to carry out a plurality of computations of encryption keys, means for determining a maximum number N of iterations needed to obtain at least one encryption key, means for obtaining a structure of data pieces representative of a key computation state achieved within said R available registers and means for computing said at least one encryption key K.

These means are driven by the microprocessor of the processing unit 52.

Although the present disclosure has been described with reference to one or more examples, workers skilled in the art will recognize that changes may be made in form and detail without departing from the scope of the disclosure and/or the appended claims.

The invention claimed is:

1. A method for obtaining at least one key for encrypting at least one piece of data transmitted from a client to a server, wherein the method comprises:
   determining a number R of registers available within said client to carry out a plurality of computations of encryption keys;
   determining a maximum number N of iterations needed to obtain at least one encryption key from said server;
   obtaining a structure of data pieces representative of a key computation state achieved within said R available registers;
   computing said at least one encryption key as a function of:
   said number of R available registers of said client, in performing at most N calls to a pseudo-random function F, and
   said structure of data pieces;
   and obtaining said at least one encryption key from a combination of at most $T = C_{R+N}^{N} - 1$ encryption keys on a basis of a secret preliminarily shared between said server and said client.

2. The method according to claim 1, wherein the number R of available registers and the maximum number N of iterations are defined as a function of constraints of the server and constraints of the client and security constraints.

3. The method according to claim 1, wherein the method further comprises, when implemented within said client, sending a piece of data representing said structure of data pieces representative of a key computation state achieved within said R available registers, registers denoted as $R_R, \ldots R_1$.

4. The method according to claim 3, wherein said structure of data pieces representative of a key computation state achieved within said R available registers is a concatenation of R integers, $st=D=D_R \ldots D_1$ each integer $D_i$ representing a distance between said secret preliminarily shared between said server and said client and a key stored in a register R of said client, said distance corresponding to a number of iterations of said pseudo-random function F.

5. The method according to claim 4 wherein said method comprises
determining, starting from the register $R_1$ up to a maximum at the register $R_R$, a position p of the smallest register $R_p$, for which an associated distance $D_p$ is strictly smaller than the number N+1, said register $R_p$ comprising an encryption key K, used for a given transaction;
updating said structure of data pieces comprising:
when $D_p<N$:
updating the p registers $R_p \ldots R_1$ by computing them on the basis of said register key K, said pseudo-random function F, said data structure D and an integer i, such that $R_i=F(K, D, i)$ for $1<=i<=p$;
updating said data structure so that $D_i=D_p+1$ with $1<=i<=p$;
when $D_p=N$, erasing the content of said register $R_p$ and updating the number $D_p=D_p+1=N+1$.

6. The method according to claim 1 wherein, when the method is implemented within said server, said obtaining comprises:
receiving a piece of data representing said structure of data pieces representative of a key computation state performed within said R available registers;
reading said received piece of data delivering said structure of representative data pieces;
computing said structure of data pieces representative of a key computation state achieved within said R available registers when said structure of representative data pieces is not directly read in said data received.

7. The method according to claim 6, wherein said structure of data pieces is defined as being a concatenation of R integers: $st=D=D_R \ldots D_1$ where each integer $D_i$ represents a distance between said secret preliminarily shared between said server and said client, and a key stored in a register $R_i$ of said client and wherein computing said at least one encryption key comprises:
initializing a local distance d at 1 and a register position p such that p=p', with p' being a number corresponding to the most significant position starting from the register $R_R$ up to the register $R_1$, such that $D_p>1$;
a first step of computation to obtain a key K=F (preliminarily shared secret, $0^R$, p') where $0^R$ corresponds to R times 0,
and at least one iteration:
of a computation to obtain a key $K=F(K, g_{p,d}(D), p)$ where $g_{p,v}(D)=D'_R \ldots D'_1$ for which $D'_i=N+1$ if i ranges from 1 and p-1, $D'_i=d$ if i=p and $D'_i=D_i$ if i ranges from p+1 and R and updating the variable d such that d=d+1 so long as the following condition is verified: $d<D_p-1$;
if the number p=1, then a computation step including obtaining a key $K=F(K, g_{p,d}(D), p)$ corresponding then to the key temporarily shared with the client and stopping the iteration of the steps;
determining a position p' such that $D_{p'}>D_p$;
if $D_{p'}!=N+1$, computing a key $K=F(K, g_{p,d}(D), p')$ and updating the variables p=p' and d=d+1;

if not, computing a key $K=F(K, g_{p,d}(D), p'+1)$ then corresponding to the key shared temporarily with the client and stopping the iteration of the steps.

8. A device for obtaining at least one key for encrypting at least one piece of data transmitted from a client towards a server, wherein the device comprises:
means for determining a number R of registers available within said client to carry out a plurality of computations of encryption keys;
means for determining a maximum number N of iterations needed to obtain at least one encryption key from said server;
means for obtaining a structure of data pieces representative of a key computation state achieved within said R available registers;
means for computing said at least one encryption key as a function of:
said number of R available registers of said client, in performing at most N calls to a pseudo-random function F, and
said structure of data pieces;
and obtaining said at least one encryption key from a combination of at most $T=C_{R+N}^N-1$ encryption keys on a basis of a secret preliminarily shared between said server and said client.

9. A non-transitory computer-readable support comprising a computer program product stored thereon and comprising program code instructions to execute a method of obtaining at least one key for encrypting at least one piece of data transmitted from a client to a server, when the instructions are executed on a computer, wherein the method comprises:
determining a number R of registers available within said client to carry out a plurality of computations of encryption keys;
determining a maximum number N of iterations needed to obtain at least one encryption key from said server;
obtaining a structure of data pieces representative of a key computation state achieved within said R available registers;
computing said at least one encryption key as a function of:
said number of R available registers of said client, in performing at most N calls to a pseudo-random function F, and
said structure of data pieces;
and obtaining said at least one encryption key from a combination of at most $T=C_{R+N}^N-1$ encryption keys on a basis of a secret preliminarily shared between said server and said client.

10. A method comprising:
generating, with a device, a signal for obtaining at least one key for encrypting at least one piece of data transmitted from a client to a server, wherein the signal comprises a structure of data pieces representing a state of encryption key computation achieved within said client, a content of said structure being a function of a number R of registers available within said client to carry out a plurality of computations of encryption keys and a maximum number N of iterations needed to obtain at least one encryption key from said server; computing said at least one encryption key using said function and obtaining said at least one encryption key from a combination of at most $T=C_{R+N}^N-1$ encryption keys on a basis of a secret preliminarily shared between said server and said client; and
transmitting the signal from the device to the server.

* * * * *